United States Patent [19]

Pelech et al.

[11] Patent Number: 5,090,450

[45] Date of Patent: Feb. 25, 1992

[54] PLUG VALVE

[75] Inventors: Gregory D. Pelech; Gary Williams, both of Alberta, Canada

[73] Assignees: Frontier Business Ltd.; Nutron Manufacturing Ltd., both of Canada

[21] Appl. No.: 706,207

[22] Filed: May 28, 1991

[30] Foreign Application Priority Data

Dec. 5, 1990 [CA] Canada ............................ 2031609

[51] Int. Cl.[5] ............................ F16K 1/52; F16K 1/48
[52] U.S. Cl. ............................ 137/625.3; 137/625.38; 251/325
[58] Field of Search ............................ 251/205, 325; 137/625.3, 625.37, 625.38

[56] References Cited

U.S. PATENT DOCUMENTS

| 771,486 | 10/1904 | McCarthy . |
| 1,868,811 | 6/1932 | Yarnall . |
| 1,977,565 | 4/1933 | Yarnall . |
| 2,029,837 | 2/1936 | Schmid . |
| 3,212,524 | 10/1967 | Caldwell .................. 137/625.38 X |

FOREIGN PATENT DOCUMENTS

| 1189423 | 6/1985 | Canada . |
| 1209560 | 8/1986 | Canada . |
| 28292 | 8/1921 | Denmark . |
| 1011237 | 6/1957 | Fed. Rep. of Germany ...... 251/325 |
| 103279 | 12/1922 | Switzerland . |

Primary Examiner—Arnold Rosenthal
Attorney, Agent, or Firm—Beveridge, DeGrandi & Weilacher

[57] ABSTRACT

A valve which is comprised of a body having an inlet passage and an outlet passage. The inlet passage intersects the outlet passage at an angle. The outlet passage has an annular shoulder. A plug is disposed within the outlet passage at the intersection of the inlet passage with the outlet passage. The plug has sides with openings thereby permitting fluids to flow the inlet passage into the outlet passage. The plug is telescopically movable in the outlet passage between a first position and a second position. In the first positon fluids flow from the inlet passage pass through the openings into the outlet passage. The openings in the plug becoming increasingly restricted as the plug moves toward the second position. In the second position the openings in the plug are totally obstructed by the outlet passage. The sides of the plug have an annular flange extending outwardly. The flange has a channel opening toward the outlet passage. A seal is disposed in the channel. When the plug is in the first position the seal means is sheltered from fluid flow within the channel. When the plug is in the second position the seal in the channel engages the annular shoulder.

6 Claims, 2 Drawing Sheets ical applications.

PLUG VALVE

The present invention relates to a valve for high pressure applications.

BACKGROUND OF THE INVENTION

Liquids flowing under pressure along a fluid flow line create a "washing" action when their course is diverted. This washing action is exacerbated when the liquids contain abrasive material. It has long been recognized that the washing action severely curtails the useful life of valves which are used to regulate the fluid flow.

Valves experience the most wear on sealing surfaces which are exposed to fluid flow when the valve is in a throttling position. When wear occurs on sealing surfaces leaking occurs.

SUMMARY OF THE INVENTION

What is requires is a valve for use in high pressure applications which has sealing surfaces which are sheltered from the washing action of fluid flow.

According to the present invention there is provided a valve which is comprised of a body having an inlet passage and an outlet passage. The inlet passage intersects the outlet passage at an angle. The outlet passage has an annular shoulder. A plug is disposed within the outlet passage at the intersection of the inlet passage with the outlet passage. The plug has sides with openings thereby permitting fluids to flow from the inlet passage into the outlet passage. The plug is telescopically movable in the outlet passage between a first position and a second position. In the first position fluids flow from the inlet passage pass through the openings into the outlet passage. The openings in the plug becoming increasingly restricted as the plug moves toward the second position. In the second position the openings in the plug are totally obstructed by the outlet passage. The sides of the plug have an annular flange extending outwardly. The flange has a channel opening toward the outlet passage. Sealing means are disposed in the channel. When the plug is in the first position the sealing means is sheltered from fluid flow within the channel. When the plug is in the second position the sealing means in the channel engages the annular shoulder. Means is provided for moving the plug between the first and second position.

Although beneficial results may be obtained through the use of the valve as described, even more beneficial results may be obtained when the annular shoulder has a bevelled surface defining a first sealing surface, and the sealing means within the channel is a bevelled side wall defining a second sealing surface. In the second position the first sealing surface engages the second sealing surface to totally obstruct fluid flow.

Although beneficial results may be obtained through the use of the embodiment described, the pattern of fluid flow is determined by the size and positioning of the openings. Even more beneficial results may, therefore, be obtained by having the openings in the sides of the plug triangular. The triangular openings extend across substantially the entire inlet passage when the plug is in the first position. Each of the triangular openings has an apex pointing toward the inlet passage such that a linear flow pattern is created as the valve moves from the second to the first position.

The means the Applicant uses to move the plug between the first position and the second position is a screw extending through a threaded passage in the body into the outlet passage. The screw has a first end connected to the plug and a second end secured to a handle external of the body.

Although beneficial results may be obtained through the use of the embodiment as described, close tolerances are required if the means of moving the plug is made integral with the plug. Even more beneficial results may be obtained by having the connection between the plug and the first end of the screw capable of limited pivotal movement whereby the plug is self-centering within the annular member. The connection used by the Applicant requires the first end of the screw to have a transverse "T" shaped slot and the plug to have a transverse "T" shaped tongue which is matingly received in the "T" shaped slot.

BRIEF DESCRIPTION OF THE DRAWINGS

These and other features of the invention will become more apparent from the following description in which reference is made to the appended drawings wherein.

DETAILED DESCRIPTION OF THE PREFERRED EMBODIMENT

Figure 2:
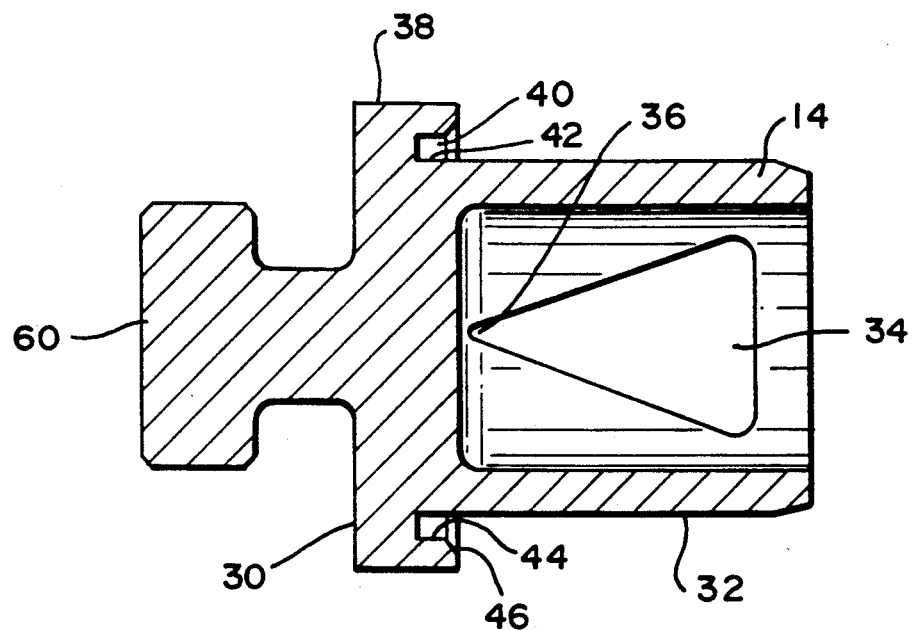
FIG. 2 is a longitudinal section view of a plug illustrated in FIG. 1.
Figure 3:
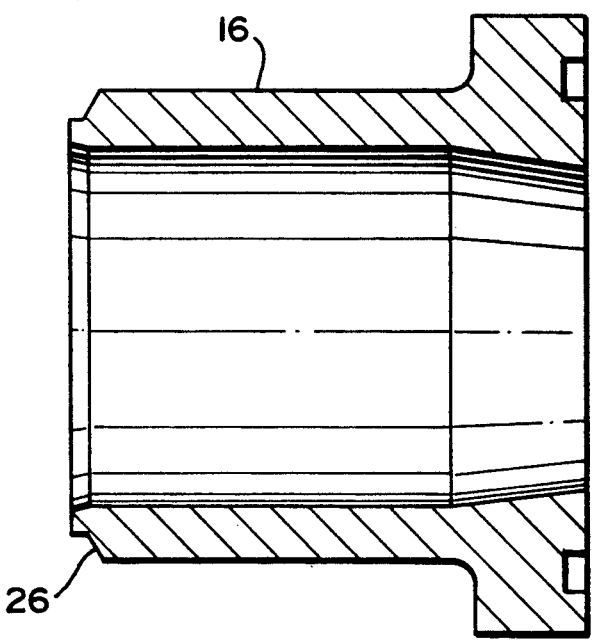
FIG. 3 is a longitudinal section view of an annular member illustrated in FIG. 1.

The preferred embodiment, a valve generally identified by reference numeral 10, will now be described with reference to FIGS. 1 through 3. The primary components of valve 10 are body 12 and plug 14.

Figure 1:
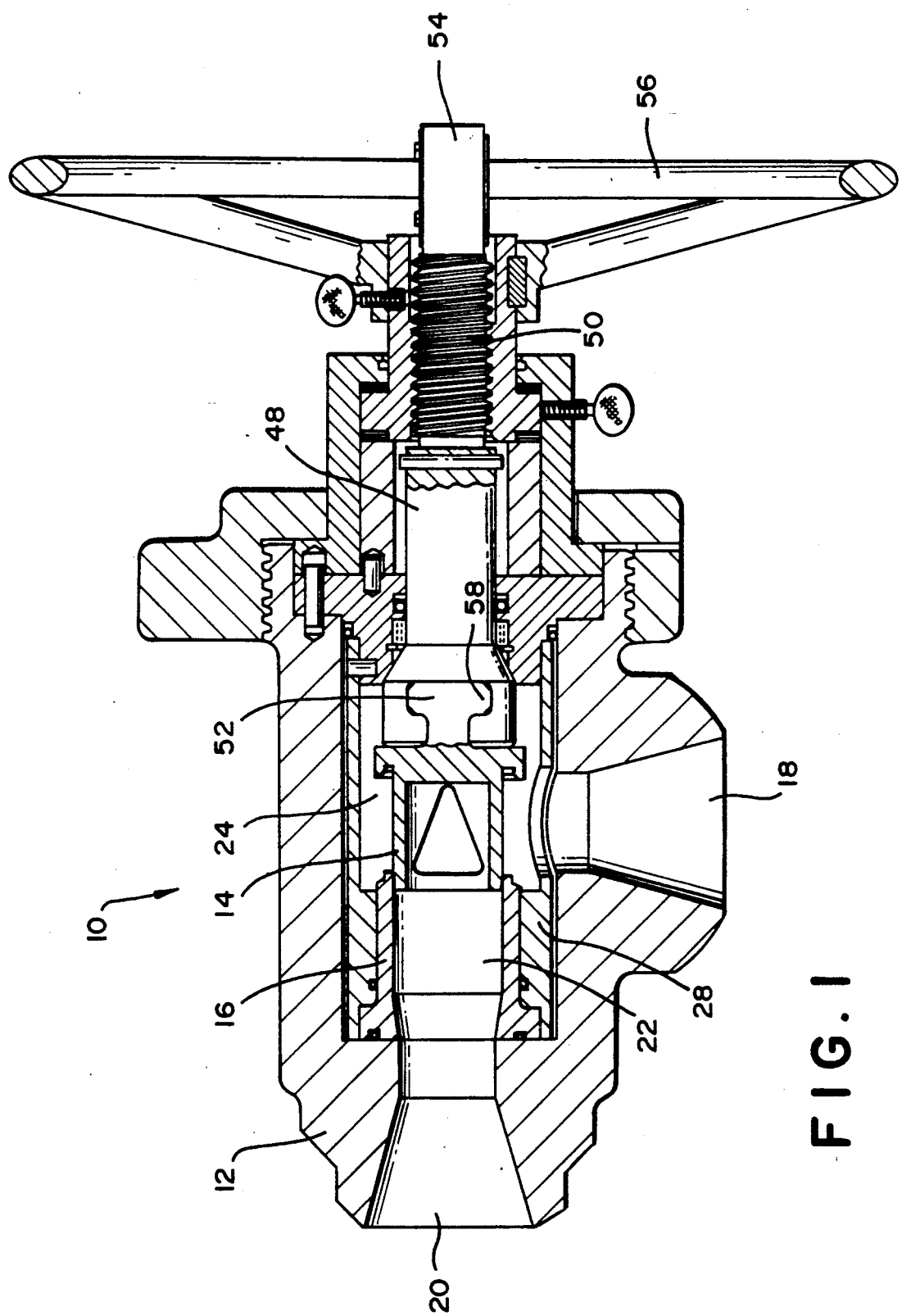
FIG. 1 is a longitudinal section view of a valve constructed in accordance with the teachings of the invention.

Referring to FIG. 1, body 12 has an inlet passage 18 and an outlet passage 20. Inlet passage 18 intersects outlet passage 20 at an angle; usually 90 degrees. Outlet passage 20 has a first portion 22 which is downstream of inlet passage 18 and a second portion 24. An annular member 16 is disposed in first portion 22 of outlet passage 20. Referring to FIG. 3, annular member 16 has an annular shoulder with a bevelled edge projecting toward second portion 24 of outlet passage 20 and inlet passage 18 defining a first sealing surface 26. Referring to FIG. 1, first sealing surface 26 is positioned in an annular recess 28 in body 12 such that first sealing surface 26 is sheltered from fluid flow by annular recess 28. Plug 14 is generally tubular having a top 30 and sides 32. Plug 14 is disposed within outlet passage 20 and is movable between a first position and a second position In the first position plug 14 is at the intersection of inlet passage 18 with outlet passage 20. In the second position plug 14 is telescopically received within annular member 16. Referring to FIG. 2, sides 32 of plug 14 have a pair of triangular openings 34 which extend across substantially the entire of inlet passage 18 when plug 14 is in the first position. Fluids flow from inlet passage 18 through triangular openings 34 into outlet passage 20 when plug 14 is in the first position. Each of triangular openings 34 have an apex 36 pointing toward second portion 24 of outlet passage 20 and inlet passage 18 such that a linear flow pattern is created as plug 14 moves from the first to the second position. An annular flange 38 extends outwardly from sides 32 adjacent top 30 of plug 14. Annular flange 38 has a channel 40 opening toward first portion 22 of outlet passage 20. Channel 40 has a first side wall 42 and a second side wall 44. First side wall 42 faces away from plug 14 and second side wall 44 faces toward the plug 14. Second side wall 44 has a bevelled surface defining a second sealing surface 46. Second sealing surface 46 is sheltered from fluid flow by second side wall 44 and channel 40. Referring to FIG. 1, a screw 48 extends through a threaded passage 50 in body 12 into second portion 24 of outlet passage 20. Screw 48 has a first end 52 connected to top 30 of plug 14 and a second end 54 secured to a handle 56 external of body 12. Plug 14 is moveable between the first position and the second position by manipulation of handle 56. First end 52 of screw 48 has a transverse "T" shaped slot 58. Top 30 of plug 14 has a transverse "T" shaped tongue 60 which is matingly received in "T" shaped slot 58. First end 52 of screw 48 being bell shaped such that first end of screw 48 cannot be withdrawn through threaded passage 50 in body 12.

The use and operation of valve 10 will now be described with reference to FIGS. 1 through 3. When plug 14 is in the first position fluids flow unimpeded from inlet 18 through triangular openings 34 to outlet 20. Unlike other valves in which a turbulent upstream flow is created resulting in cavitation, the fluid flows through triangular openings 34 at an angle and then along downstream portion 22 of outlet passage 20. By turning handle 56 screw 48 is caused to move along threaded passage 50 of body 12 gradually moving plug 14 from the first position to the second position. The connection between "T" shaped slot 58 at first end 52 of screw 48 and "T" shaped tongue 60 at top 30 of plug 14 allows limited pivotal movement. The limited pivotal movement allows plus 14 to be self-centering as plug 14 telescopically engages annular member 16 in moving from the first position to the second position. Problems have been encountered in the past with integrally formed valves due to the close tolerances required, together with vibrations and stresses which are an unavoidable consequence of the pressures to which valve 10 are subjected. As plug 14 moves from the first position to the second position triangular openings 34 are increasingly restricted by annular member 16 in which plug 14 is telescopically received. In this throttling position, where valve 10 is not fully open and not fully closed the most wear on sealing surfaces previously occurred. All exposed sealing surfaces were subjected to a washing action, which pitted them and drastically reduced their useful life. In valve 10 both first sealing surface 26 and second sealing surface 46 are sheltered. First sealing surface 26 is sheltered within annular recess 28. Second sealing surface 46 is sheltered within channel 40. Fluid flow is totally obstructed when plug 14 reaches the second position with first sealing surface 26 engaging second sealing surface 46. In the past when a component failed as a result of metal fatigue there was a danger that a portion of a valve would act like a missile and be propelled dangerously outwardly by the pressure. First end 52 of screw 48 is enlarged to from a generally bell shape so that in the event of failure it cannot pass through threaded passage 50.

It will be apparent to one skilled in the art that modifications can be made to the illustrated embodiment without departing from the spirit and scope of the invention as defined by the claims.

The embodiments of the invention in which an exclusive property or privilege is claimed are defined as follows:

1. An improvement in a valve having a body with an outlet passage, an inlet passage intersecting the outlet passage at an angle, a plug disposed within the outlet passage at the intersection of the inlet passage and the outlet passage, the plug having sides with openings thereby permitting fluids to flow from the inlet passage into the outlet passage, the plug being telescopically movable in the outlet passage between a first position and a second position such that in the first position fluids flowing from the inlet passage pass through the openings into the outlet passage, the openings in the plug becoming increasingly restricted as the plug moves toward the second position until in the second position the openings in the plug are totally obstructed by the outlet passage, and means for moving the plug between the first and second position, the improvement comprising:
    an annular shoulder in the outlet passage downstream of the inlet passage; and
    an annular flange extending outwardly from the sides of the plug, the flange having a channel opening toward the downstream portion of the outlet passage, sealing means being disposed in the channel such that when the plug is in the first position the sealing means is sheltered from fluid flow within the channel and when the plug is in the second position the sealing means in the channel engages the annular shoulder.

2. The improvement as defined in claim 1, the annular shoulder having a bevelled surface defining a first sealing surface, the sealing means within the channel being a bevelled side wall defining a second sealing surface, such that in the second position the first sealing surface engages the second sealing surface to totally obstruct fluid flow.

3. The improvement as defined in claim 1, the openings in the sides of the plug being triangular, the triangular openings extending across substantially the entire inlet passage when the plug is in the first position, each of the triangular openings having an apex pointing toward the inlet passage, such that a linear flow pattern is created as the plug moves from the first to the second position.

4. The improvement as defined in claim 1, the means for moving the plug between the first position and the second position being a screw extending through a treaded passage in the body into the upstream portion of the outlet passage, the screw having a first end connected to the plug and a second end secured to a handle external of the body, the connection between the plug and the first end of the screw being capable of limited pivotal movement such that the plug is self-centering within the outlet passage.

5. The improvement as defined in claim 4, the first end of the screw having a transverse "T" shaped slot, and the plug having a transverse "T" shaped tongue which is matingly received in the "T" shaped slot.

6. A valve, comprising:
    a. a body having an inlet passage and an outlet passage, the inlet passage intersecting the outlet passage at an angle, the outlet passage having an annular shoulder, the annular shoulder having a bevelled surface defining a first sealing surface;
    b. a plug disposed within the outlet passage at the intersection of the inlet passage with the outlet passage, the plug having sides with openings thereby permitting fluids to flow from the inlet passage into the outlet passage, the plug being telescopically movable in the outlet passage between a first position and a second position such that in the first position fluids flowing from the inlet passage pass through the openings into the outlet passage, the openings in the plug becoming increasingly restricted as the plug moves toward the second position until in the second position the openings in the plug are totally obstructed by the outlet passage, the openings in the sides of the plug being triangular, the triangular openings extending across substantially the entire inlet passage when the plug is in the first position, each of the triangular openings having an apex pointing toward the inlet passage, such that a linear flow pattern is created as the plug moves from the first to the second position, the sides of the plug having an annular flange extending outwardly, the flange having a channel opening toward the outlet passage, the channel having a bevelled side wall defining a second sealing surface, such that when the plug is in the first position the second sealing surface is sheltered from fluid flow within the channel and when the plug is in the second position the first sealing surface on the annular shoulder engages the second sealing surface to totally obstruct fluid flow; and c. a screw extending through a threaded passage in the body into the upstream portion of the outlet passage, the screw having a first end connected to the plug and a second end secured to a handle external of the body, the first end of the screw having a transverse "T" shaped slot, and the plug having a transverse "T" shaped tongue which is matingly received in the "T" shaped slot, the tongue and slot connection being capable of limited pivotal movement such that the plug is self-centering within the outlet passage.

* * * * *